US008549508B2

(12) United States Patent
Makarov (10) Patent No.: US 8,549,508 B2
(45) Date of Patent: Oct. 1, 2013

(54) MECHANISM FOR PERFORMING INSTRUCTION SCHEDULING BASED ON REGISTER PRESSURE SENSITIVITY

(75) Inventor: Vladimir Makarov, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 572 days.

(21) Appl. No.: 12/717,028

(22) Filed: Mar. 3, 2010

(65) Prior Publication Data

US 2011/0219216 A1 Sep. 8, 2011

(51) Int. Cl.
*G06F 9/45* (2006.01)

(52) U.S. Cl.
USPC ........... 717/161; 717/140; 717/149; 717/151; 717/160

(58) Field of Classification Search
None
See application file for complete search history.

(56) References Cited

U.S. PATENT DOCUMENTS

| | | | | |
|---|---|---|---|---|
| 5,367,651 A * | 11/1994 | Smith et al. | ................... | 717/149 |
| 7,089,344 B1 * | 8/2006 | Rader et al. | ................... | 710/308 |
| 7,657,883 B2 * | 2/2010 | Jensen | ........................... | 717/161 |
| 7,770,161 B2 * | 8/2010 | Mitran et al. | ................. | 717/151 |
| 8,332,829 B2 * | 12/2012 | Mattson | ........................ | 717/140 |
| 2002/0013937 A1 * | 1/2002 | Ostanevich et al. | .......... | 717/160 |
| 2003/0237080 A1 * | 12/2003 | Thompson et al. | .......... | 717/161 |
| 2004/0154006 A1 * | 8/2004 | Heishi et al. | .................. | 717/140 |
| 2006/0010264 A1 * | 1/2006 | Rader et al. | ..................... | 710/23 |
| 2007/0101320 A1 * | 5/2007 | Tang et al. | .................... | 717/161 |
| 2007/0150880 A1 * | 6/2007 | Mitran et al. | ................. | 717/161 |

OTHER PUBLICATIONS

Susan J. Eggers et al., Integrating Register Allocation and Instruction Scheduling for RISG; 1991 ACM, pp. 122-131; <http://dl.acm.org/citation.cfm?id=106986>.*
Shlomit S. Pinter; Register Allocation with Instruction Scheduling: a New Approach; 1993 ACM; pp. 248-257; <http://dl.acm.org/citation.cfm?id=155114>.*
David A. Berson1 et al.; Integrated Instruction Scheduling and Register Allocation Techniques; 1999 Springer; pp. 247-262; <http://link.springer.com/content/pdf/10.1007%2F3-540-48319-5_16.pdf>.*
Daniel R. Kernst et al.; Balanced Scheduling: Scheduling When Memory Latency is Uncertain; 1993 ACM; pp. 278-189; <http://dl.acm.org/citation.cfm?id=155117>.*
Cindy Norris et al.; An Experimental study of several cooperative register allocation and instruction scheduling strageges; 1995 ACM; 11 pages; <http://pdf.aminer.org/000/499/336>.*
Josep M. Codina et al.; A Unified Modulo Scheduling and Register Allocation Technique for Clustered Processors; 2001 IEEE; pp. 175-183; <http://ieeexplore.ieee.org/stamp/stamp.jsp?tp=&arnumber=953298>.*

* cited by examiner

*Primary Examiner* — Thuy Dao
*Assistant Examiner* — Cuong V Luu
(74) *Attorney, Agent, or Firm* — Lowenstein Sandler LLP (57) ABSTRACT

A mechanism for performing instruction scheduling based on register pressure sensitivity is disclosed. A method of embodiments of the invention includes performing a preliminary register pressure minimization on program points during a compilation process of a software program running on a virtual machine of a computer system. The method further includes calculating a register pressure at each of the program points, detecting an instruction to be scheduled, and performing instruction scheduling of the instruction based on a current register pressure at a current scheduling point and potential register pressures at subsequent scheduling points.

14 Claims, 5 Drawing Sheets

MECHANISM FOR PERFORMING INSTRUCTION SCHEDULING BASED ON REGISTER PRESSURE SENSITIVITY

TECHNICAL FIELD

The embodiments of the invention relate generally to compiler optimization and, more specifically, relate to a mechanism for performing instruction scheduling based on register pressure sensitivity.

BACKGROUND

In compiler optimization, "register allocation" and "instruction scheduling" are well-known processes that are employed for improving machine performance. A compiler transforms a software program's programming language source code into a machine code (also referred to as "generated code") that is understandable by computer system. During transformation, an intermediate stage is reached when the compiler provides intermediate representation of the internal representation of the transformation process. Optimizing a compiler refers to aiming a compiler to make such transformation in an efficient manner (e.g., producing an efficient code using the least amount of resources).

Register allocation refers to mapping program variables (also referred to as "pseudos") with central processing unit (CPU) registers (also referred to as "processor registers") residing at a processor of a computer system. Instruction scheduling is used to increase a processor's instruction throughput. Instruction scheduling refers to rearranging the order of instructions of software program code in a processor pipeline to avoid pipeline stalls without changing the meaning or the goal of the software program code.

A number of processor registers on any processor is considered limited since that number strictly depends on the architectural design of the processor and thus, any number of available processor registers is considered a smaller number compared to the large number of data items or program variables a typical software programs has to process. This discrepancy, known as "high register pressure", leads to what is typically referred to as "spilling". Spilling occurs when there are more live programs variables than there are available processor registers and the compiler is forced to spill some of the program variables to memory (from processor registers). Spilling leads to inefficiency because accessing memory is typically slower than accessing registers.

A program variable living at a program point refers to a variable that contains a value that can be used by its software program at the program point or at the subsequently executed program points. Register pressure at a program point is a number of program variables living at the program point of the software program. High register pressure occurs when the number of living program variables is greater than the number of available processor registers.

Although both register allocation and instruction scheduling are used for compiler optimization (which in turn, improves machine performance), the two processes do not always complement each other and, often, act as contradicting optimization processes. For example, instruction scheduling is typically done by removing an instruction from the original instruction list and placing it at the end of a result list without taking into account its overall impact on register allocation, which increases register pressure on subsequent scheduling points. That is, register pressure is considered only at the current scheduling point without taking into account register pressures at other program points (e.g., subsequent scheduling points). A program point is referred to as scheduling point if instruction scheduling is performed at that program point.

Hence, the more frequent the instruction scheduling, the higher the register pressure on subsequent scheduling points or on the holding list of instructions and thus, more spills have to be performed during register allocation, which negatively impacts the process of compiler optimization.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for instruction scheduling based on register pressure sensitivity. A method of embodiments of the invention includes performing a preliminary register pressure minimization on program points during a compilation process of a software program running on a virtual machine of a computer system. The method further includes calculating a register pressure at each of the program points, detecting an instruction to be scheduled, and performing instruction scheduling of the instruction based on a current register pressure at a current scheduling point and potential register pressures at subsequent scheduling points.

Embodiments of the invention improve instruction scheduling to provide efficient compiler optimization and improved generated code performance. Embodiments for instruction scheduling provide for a smaller, faster and efficient generated code and avoid complication of using instruction scheduling integrated with register allocation or instruction scheduling based on register saturation. Compiler optimization and improved generated code performance can result in a large saving of system resources. For example, a 1% improvement in generated code performance translates into a saving of 1% computer power consumption for the computer system where the generated code is executed.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "performing", "calculating", "detecting", "determining", "adding", "removing", "rearranging", "updating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, read-only memories (ROMs), compact disk ROMs (CD-ROMs), random access memories (RAMs), erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Figure 1:
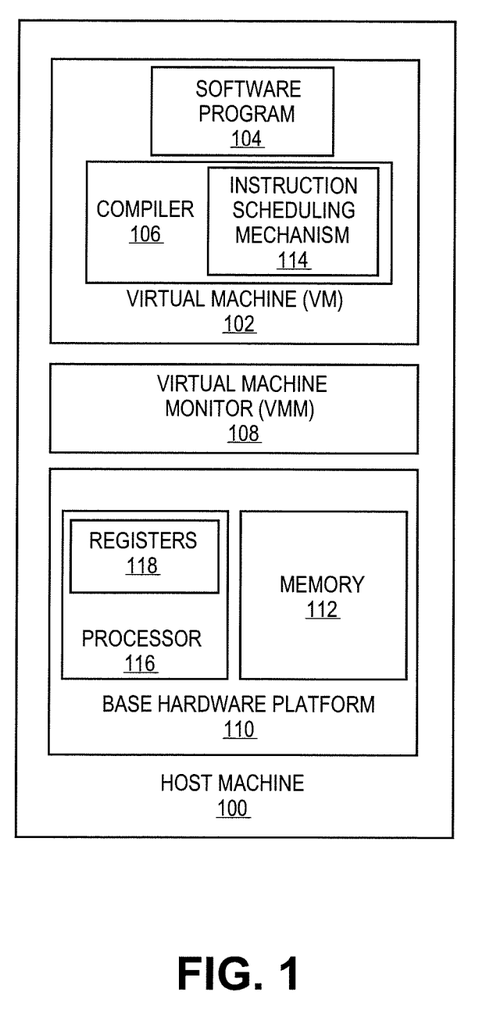
FIG. 1 is a block diagram illustrating a host machine for employing an instruction scheduling mechanism to perform instruction scheduling based on register pressure sensitivity according to one embodiment of the invention.

FIG. 1 is a block diagram of a host machine 100 for employing an instruction scheduling mechanism 114 for performing instruction scheduling based on register pressure sensitivity according to one embodiment of the invention. Host machine 100 includes a base hardware platform 110 that comprises a computing platform, which may be capable, for example, of executing a standard operating system ("OS") or a virtual machine monitor ("VMM") 108. In some embodiments, base hardware platform 110 may include a processor 116, memory devices 112, network devices, drivers, and so on. VMM 108 virtualizes these physical resources of the base hardware platform 110 of host machine 100 for one or more VMs 102. Embodiments of the invention encompass host machine 100 being capable of hosting many VMs simultaneously, but only one VM 102 is shown here for purposes of brevity, clarity, and ease of explanation. VM 102 hosts a software program 104.

VM 102 further hosts a compiler 106 to transform the source code of software program 104 from a high-level programming language or source language (e.g., C, C++, etc.) to a lower level language or object code (e.g., machine code, assembly language, etc.) such that the software program 104 can become an executable program. Base hardware platform 110 hosts processor 116 that includes processor registers 118.

As aforementioned, compiler 106 includes a software tool for transforming software program 104 written with a high-level programming language into a low level machine code understandable by a computer system. Compiler optimizing is aimed at making such transformation as efficient as possible, and register allocation and instruction scheduling are regarded important for improving compiler performance and optimization. Intermediate representation refers to a compiler's internal representation or level on which a software program's transformation from a programming language into a machine language is performed. At this level, software program 104 being compiled is regarded as an intermediate code.

In one embodiment, as illustrated, compiler 106 hosts an instruction scheduling mechanism 114 to perform instruction scheduling based on register pressure sensitivity. Instruction scheduling is used to increase a processor's instruction throughput and, generally, refers to rearranging the order of software program code instructions to avoid pipeline stalls without changing the meaning or the goal of the software program 104.

Register allocation refers to a process for assigning an unconstrained number of pseudos to a constrained number of machine registers 118 or spill them to memory 112. Typically, each register 118 holds a single value at any given program point. Register allocation suffers from high register pressure when the number of live pseudos associated with software program 104 is greater than the number of available processor registers of registers 118 at various program points (e.g., points in the intermediate code reached by software program 104). Register pressure at a program point is a number of program variables living at the program point of the software program 104. High register pressure occurs when the number of living program variables is greater than the number of available processor registers of the processor registers 118.

A pseudo or program variable is regarded as holding a value during compiler optimization of software program 104. A pseudo is said to be live at a program point if it holds a value relating to software program 104 that can be used by its software program 104 at the program point or at the subsequently executed program points. In this context, register pressure refers to a number of live non-spilled and unassigned pseudos at any given program point that is higher than the number of available processor registers 118 (for accepting the live non-spilled and unassigned pseudos).

In one embodiment, instruction scheduling is performed prior to register allocation to obtain greater flexibility in dealing with unconstrained pseudos relating to instruction scheduling as opposed to dealing with a constrained number of processor registers 118. In one embodiment, instruction scheduling mechanism 114 is used to perform instruction scheduling by taking into account both a current register pressure at a current scheduling point and potential register pressures that are calculated for any subsequent scheduling points that may occur during compilation so that an overall impact of instruction scheduling on register allocation and the compilation process can be evaluated.

In one embodiment, if register pressure at a current instruction schedule point is not high and rearranging an instruction is not expected to increase register pressures at any subsequent scheduling points, the instruction may be placed in the result list. If, however, register pressure at the current scheduling point is regarded as high or is expected to be high at any of the subsequent scheduling points, in one embodiment, using instruction scheduling mechanism 114, the sensitivity and impact of this register pressure and potential register pressures is taken into considered for selecting an instruction. Several factors may be taken into account before this decision is made to select an instruction so that the selection of the instruction results in decreasing (or increasing by the smallest/minimal possible amount) the current high register pressure and/or potential high register pressures. Further, placing in the result list may refer to a program point between the result list end and the rest of the original instruction list.

In one embodiment, using the instruction scheduling mechanism 114, register pressure for each program point is calculated initially, such as prior to any instruction scheduling. When the register pressure is high at the current scheduling point or any subsequent scheduling points, the current instruction is selected based on the register pressure calculation. The current instruction is then moved to the end of the result list, while the register pressure at the subsequent scheduling points is updated, and a next available instruction that decreases the high current and/or potential register pressures is selected for scheduling. If, however, such an instruction (e.g., an instruction that decreases the high current and/or potential register pressures) is not available, then using the calculated register pressures, the next available instruction that increases the high register pressure by only a minimal amount is selected for scheduling.

Additionally, some other factors, such as critical path length, availability of functional units for instruction execution, data dependency determination for both the instruction that is being rescheduled and the next available instruction that is chosen for processing or the like may also be considered. Data dependency refers to one instruction's dependence on another instruction for execution, such as a first instruction has to follow a second instruction because the first instruction's performance (e.g., a read task) depends on the previous performance of the second instruction (e.g., a write task).

In one embodiment, instruction scheduling mechanism 114 also considers the possibility that even if the register pressure is low at the current (or any given) scheduling point, a potential high register pressure could be experienced or encountered at any number of subsequent instruction scheduling points. The instruction scheduling mechanism 114 uses the initially calculated and the updated register pressures at each program point to avoid or minimize any potential register pressure increases in the result list. The potential high register pressured at the subsequent instruction scheduling points are determined to be close to register pressures at the program points because of, for example, the aforementioned preliminary register pressure minimization.

Figure 2A:
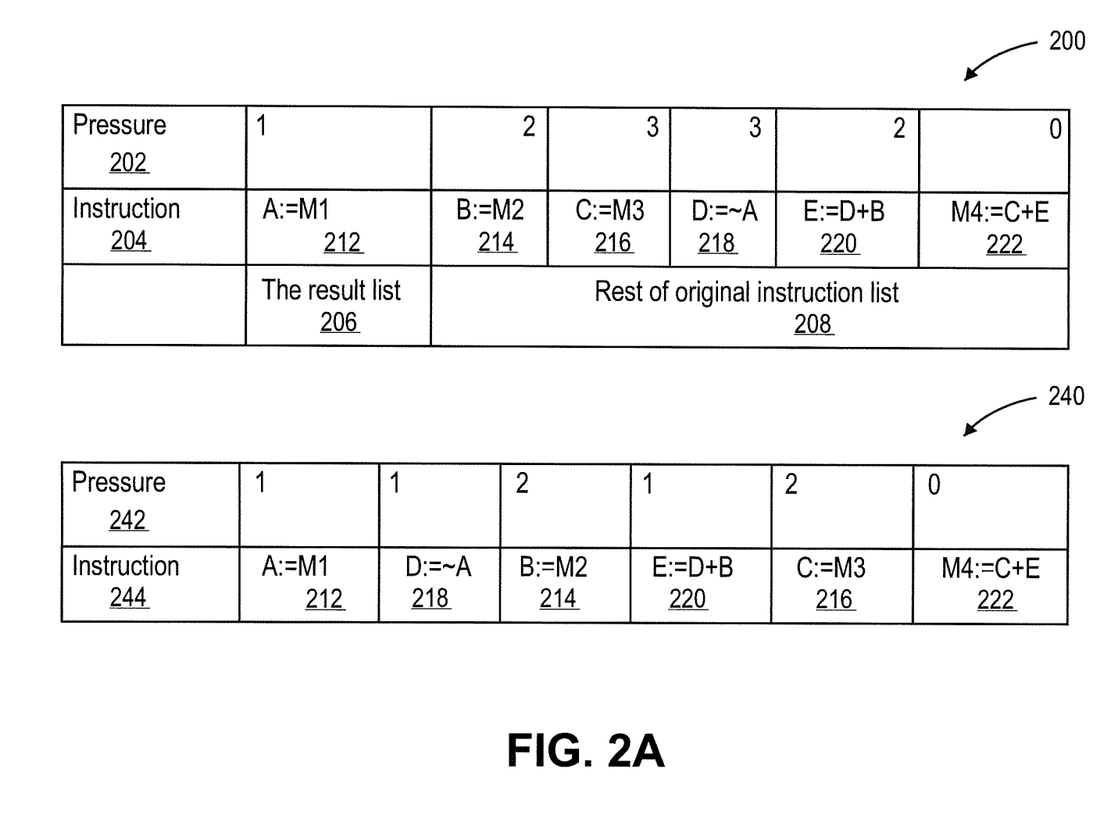
FIG. 2A is a transaction sequence illustrating a process for instruction scheduling based on register pressure sensitivity according to one embodiment of the invention.

FIG. 2A is a transaction sequence illustrating a process for instruction scheduling based on register pressure sensitivity according to one embodiment of the invention. In one embodiment, maximal register pressures are calculated and applied to each scheduling point (including a current scheduling point and subsequent program points) in the program path. Assuming a computer system's processor has two processor registers, table 200 represents an instruction list 204 having instructions 212-222, each instruction's corresponding pressure 202 (at the program point after the instruction), a result list 206, and the rest of the original instruction list 208. As illustrated, instruction A:=M1 212 is placed in the result list 206. The program point between instructions A:=M1 212 and B:=M2 214 now represents the current scheduling point. Instruction B:=M2 214 is followed by instructions C:=M3 216, D:=~A 218 and so forth.

As illustrated in the path of table 200, register pressure increases with each instruction as indicated in the pressure list as 2 (instruction 214), 3 (instruction 216), 3 (instruction 218), etc. However, in one embodiment, using the calculated register pressures, a high register pressure program point is known (such as instruction D:=~A 218 being 3), but it is also determined to lower the register pressure when it is rearranged. As such, as shown in table 240, the available instruction D:=~A 218 is moved to the end of the result list to decrease the register pressure. Accordingly, list 242 of table 240 illustrates lower register pressures of 1, 1, 2, 1, 2, 0 as they correspond to the rearranged instructions 212, 218, 214, 220, 216, 222 of instruction list 244 after the instruction scheduling is finished.

Figure 2B:
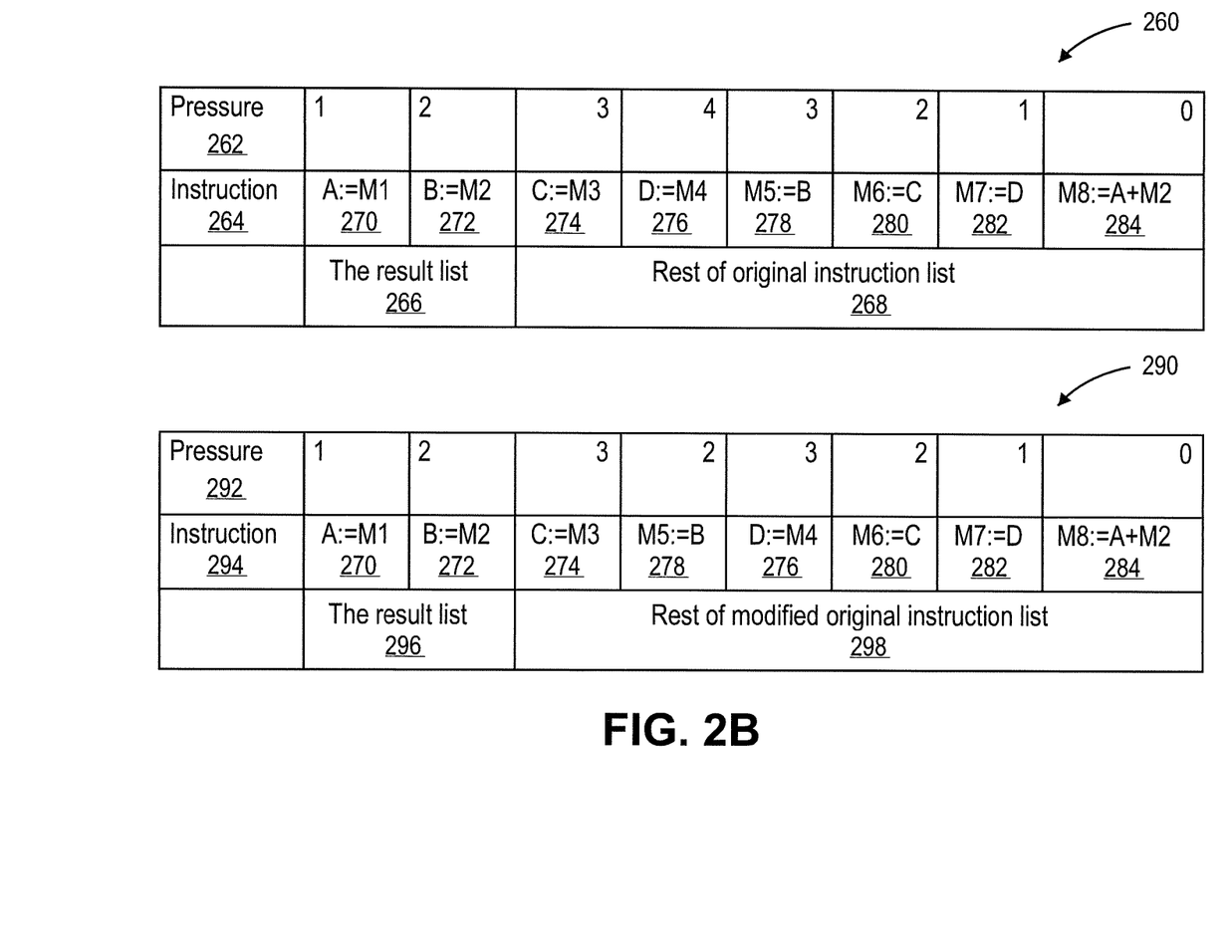
FIG. 2B is a transaction sequence illustrating preliminary register pressure decrease or minimization for instruction scheduling based on register pressure sensitivity according to one embodiment of the invention.

FIG. 2B is a transaction sequence illustrating preliminary register pressure decrease or minimization for instruction scheduling based on register pressure sensitivity according to one embodiment of the invention. Table 260 illustrates an instruction list 264 without the preliminary register pressure minimization (or decrease) having instructions 270-284 based on their corresponding register pressures 1, 2, 3, 4, 3, 2, 1 and 0, as illustrated, in pressure list 262 in a computer system having a processor with three processor registers.

In one embodiment, a preliminary calculation of register pressures for program points (including potential scheduling points) is performed. Let us suppose, the preliminary calculation indicates that if instructions D:=M4 276 and M5:=B 278 having register pressures 4 and 3, respectively, where to be switched, their corresponding register pressures would be reduced to 3 and 2, respectively. Accordingly, the preliminary register pressure decreasing or minimization of instructions 270-284 is made to reflect potential register pressures at various subsequent scheduling points. Table 290 illustrates the rearranged instruction list 294 showing decreased register pressures of 1, 2, 3, 2, 3, 2, 1 and 0 for instructions 270, 272, 274, 278, 276, 280, 282 and 284, respectively. Without the preliminary register pressure minimization (or decrease), instruction M5:=B 278 is added to the result list to decrease high register pressure at D:=M4 276. With the preliminary register pressure minimization (or decrease), the best available instruction C:=M3 274, D:=M4 276, or M5:=B 278 is added to the result list to improve instruction throughput.

Figure 3:
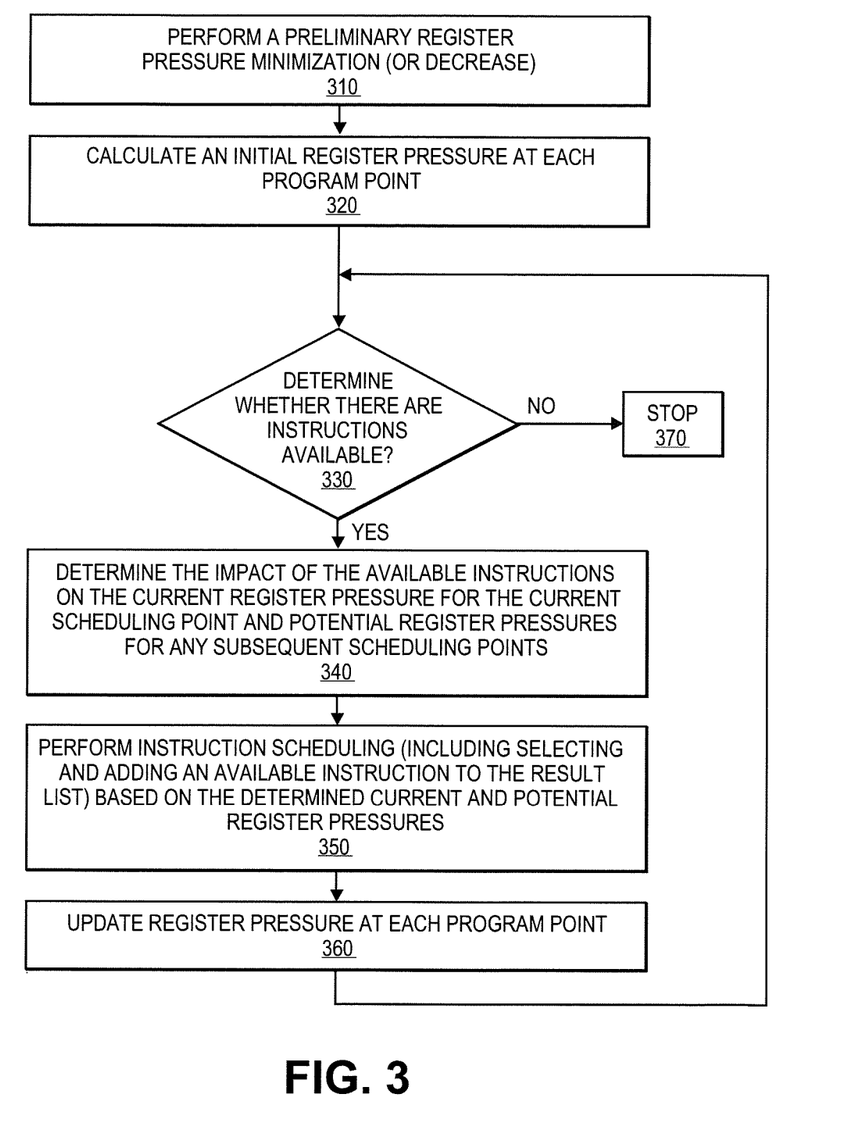
FIG. 3 is a flow diagram illustrating a method for instruction scheduling based on register pressure sensitivity according to one embodiment of the invention.

FIG. 3 is a flow diagram illustrating a method for instruction scheduling based on register pressure sensitivity according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by instruction scheduling mechanism of FIG. 1.

Method 300 begins at block 310 where instruction scheduling mechanism performs a preliminary register pressure minimization or decrease for source code instructions of a software program about to be compiled into a machine code on a virtual machine of a computer system. At block 320, an initial register pressure calculation is performed to calculate a register pressure at each of the program points. In one embodiment, these initial register pressures at the program points are calculated based on an initial arrangement of code instructions of the software program. Further, this initial arrangement of the code instructions may be performed based on results of the preliminary register pressure minimization.

At block 330, a determination is made as to whether there are any instruction available for scheduling (or rearrangement). If there are no available instructions, the instruction scheduling process ends at block 370. If, however, there are available instructions, in one embodiment, a determination is made as to the impact of instruction scheduling of the available instructions on a current register pressure for the current scheduling point and potential register pressures corresponding to subsequent scheduling points at block 340. At block 350, based on the determined impact on the current and potential register pressures, instruction scheduling (or rearrangement) of an available instruction of the available instructions is performed (e.g., selecting and adding an available instruction to the result list). Instruction scheduling is performed such that the current and/or potential register pressures is/are decreased (or, alternatively, increased by a minimal amount). Next, register pressure for each program point is updated accordingly at block 360.

In one embodiment, instruction scheduling is performed based not only on the current register pressure that is calculated for the current scheduling point, but also the potential register pressures corresponding to the subsequent scheduling points. In one embodiment, as aforementioned, based on the register pressure calculation and the determined impact on the current and potential register pressures, an available instruction that decreases the high register pressure is selected and if such an instruction is not available, the next available instruction that increases the high register pressure by only a minimal amount is selected for processing.

Figure 4:
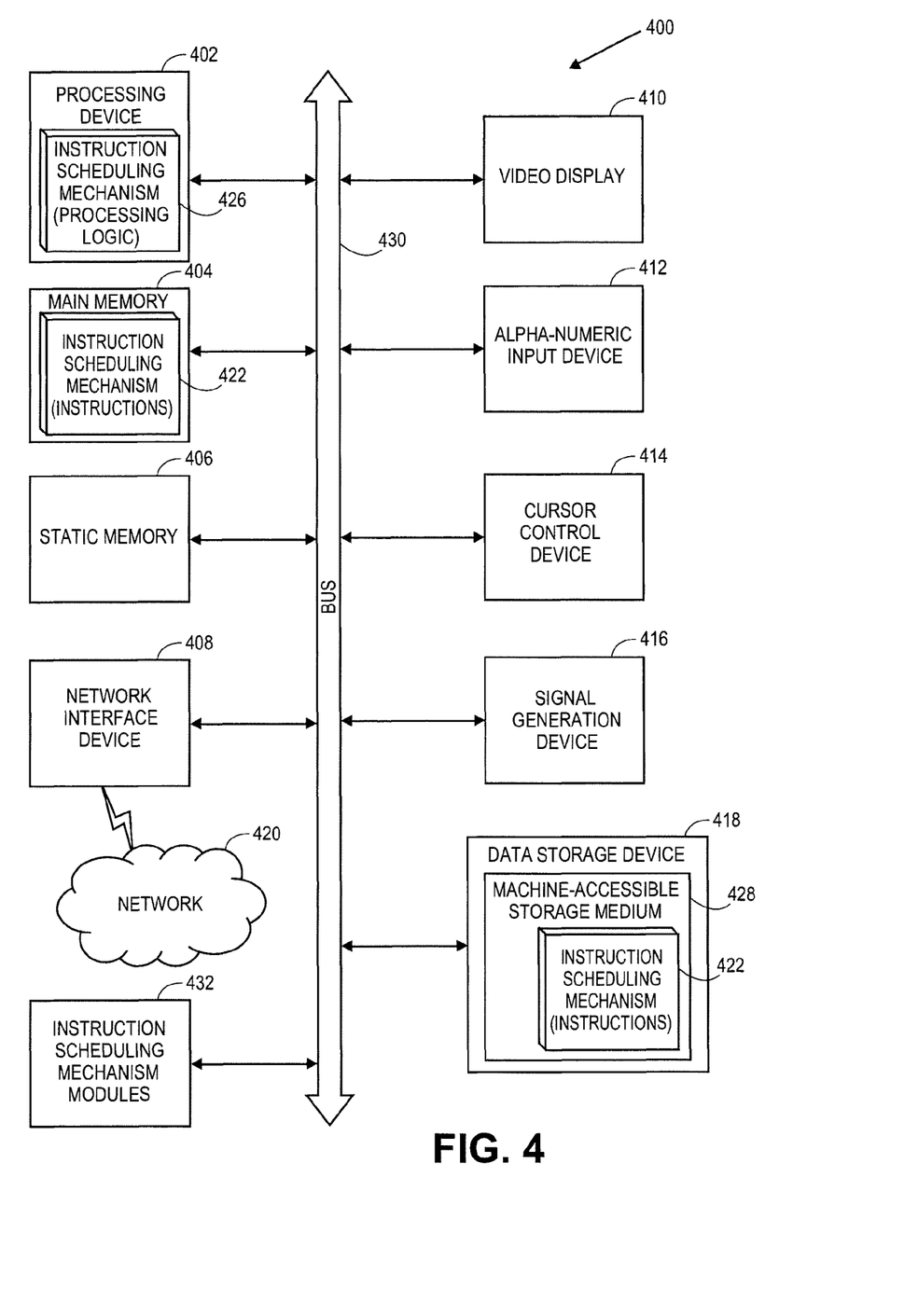
FIG. 4 is a block diagram illustrating a computer system for performing instruction scheduling based on register pressure sensitivity according to one embodiment of the invention.

FIG. 4 is a block diagram of one embodiment of a computer system 400 for performing instruction scheduling based on register pressure sensitivity according to one embodiment of the invention. Within the computer system 400 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., ROM, flash memory, dynamic random access memory (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computer system 400 may further include a network interface device 408. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., the instruction scheduling mechanism) embodying any one or more of the methodologies or functions described herein. The instruction scheduling mechanism may also reside, completely or at least partially, within the main memory 404 (e.g., instruction scheduling mechanism instructions 422) and/or within the processing device 402 (e.g., instruction scheduling mechanism processing logic 426) during execution thereof by the computer system 400, the main memory 404 and the processing device 402 also constituting machine-readable storage media. Further, for example, the instruction scheduling mechanism instructions 422 may be transmitted or received over a network 420 via the network interface device 408.

The machine-readable storage medium 428 may also be used to store the instruction scheduling mechanism 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Instruction scheduling mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
performing a preliminary register pressure minimization on program points of a software program;
calculating a register pressure at a first program point and a subsequent second program point;
prior to instruction scheduling, determining an impact of the instruction scheduling for an instruction on the register pressure at the first program point and the potential register pressure at the subsequent second program point;
performing by a computer system, after the preliminary register pressure minimization, the instruction scheduling of the instruction that is at the first program point of the software program in view of the register pressure at the first program point and the potential register pressure at the subsequent second program point of the software program; and
updating the register pressures at the first and the subsequent second program points.

2. The method of claim 1, wherein the instruction scheduling decreases the register pressure at the first program point and the potential register pressure at the subsequent second program point.

3. The method of claim 1, wherein the instruction scheduling increases, by a minimal amount, the register pressure at the first program point and the potential register pressure at the subsequent second program point.

4. The method of claim 1, wherein the instruction scheduling comprises rearranging an order of other instructions in the software program based on the register pressure at the first program point and the potential register pressure at the subsequent second program point.

5. The method of claim 1, wherein the calculating is after the preliminary register pressure minimization.

6. A system comprising:
a memory to store a software program; and
a processor communicably coupled to the memory to:
perform a preliminary register pressure minimization on program points of the software program,
calculate a register pressure at a first program point and a subsequent second program point,
prior to instruction scheduling, determine an impact of the instruction scheduling for an instruction on the register pressure at the first program point and the potential register pressure at the subsequent second program point;
perform, after the preliminary register pressure minimization, the instruction scheduling of the instruction that is at the first program point of the software program in view of the register pressure at the first program point and the potential register pressure at the subsequent second program point of the software program; and
update the register pressures at the first and the subsequent second program points.

7. The system of claim 6, wherein the instruction scheduling decreases the register pressure at the first program point and the potential register pressure at the subsequent second program point.

8. The system of claim 6, wherein the instruction scheduling increases, by a minimal amount, the register pressure at the first program point and the potential register pressure at the subsequent second program point.

9. The system of claim 6, wherein the instruction scheduling comprises rearranging an order of other instructions in the software program based on the register pressure at the first program point and the potential register pressure at the subsequent second program point.

10. The system of claim 6, wherein the calculating is after the preliminary register pressure minimization.

11. A non-transitory machine-readable storage medium having instructions that, when executed by a computer system, cause the computer system to perform operations comprising:
performing a preliminary register pressure minimization on program points of a software program;
calculating a register pressure at a first program point and a subsequent second program point;
prior to instruction scheduling, determining an impact of the instruction scheduling for an instruction on the register pressure at the first program point and the potential register pressure at the subsequent second program point;
performing by a computer system, after the preliminary register pressure minimization, the instruction scheduling of the instruction that is at the first program point of the software program in view of the register pressure at the first program point and the potential register pressure at the subsequent second program point of the software program; and
updating the register pressures at the first and the subsequent second program points.

12. The non-transitory machine-readable storage medium of claim 11, wherein the instruction scheduling decreases the register pressure at the first program point and the potential register pressure at the subsequent second program point.

13. The non-transitory machine-readable storage medium of claim 11, wherein the instruction scheduling is performed such that the current register pressure and the potential register pressures are increased by a minimal amount.

14. The non-transitory machine-readable storage medium of claim 11, wherein the instruction scheduling comprises rearranging an order of other instructions in the software program based on the register pressure at the first program point and the potential register pressure at the subsequent second program point.

* * * * *